United States Patent [19]

Stuart

[11] 4,332,169

[45] Jun. 1, 1982

[54] SPEED NUT FOR A WHEEL BALANCER

[75] Inventor: Robert J. Stuart, Murfreesboro, Tenn.

[73] Assignee: Hennessy Industries, Inc., Elk Grove Village, Ill.

[21] Appl. No.: 159,816

[22] Filed: Jun. 16, 1980

[51] Int. Cl.³ ............................................. G01M 1/02
[52] U.S. Cl. ..................................... 73/487; 411/433
[58] Field of Search .................. 73/460, 487; 411/433; 301/9 CN, 9 DH

[56] References Cited

U.S. PATENT DOCUMENTS

| | | | |
|---|---|---|---|
| 1,157,564 | 10/1915 | Mason | 411/433 |
| 2,789,458 | 4/1957 | Skeisvoll | 411/433 |
| 4,188,828 | 2/1980 | Cuccolini | 73/460 |
| 4,275,594 | 6/1981 | Varga et al. | 73/487 |

Primary Examiner—James J. Gill

Attorney, Agent, or Firm—Wegner, McCord, Wood & Dalton

[57] ABSTRACT

A wheel balancer having a threaded shaft with a free end for receiving a wheel to be balanced and a drive for rotating the shaft to a wheel secured thereon so as to enable the obtaining of data relative to imbalance of the wheel as the wheel rotates. A locating device is provided for engaging a wheel on the shaft to locate the wheel properly thereon and a nut is utilized in connection with the shaft for holding the wheel against the locating device. The nut includes apparatus for selectively moving the nut threads radially inwardly into engagement with the shaft threads and radially outwardly out of engagement with the shaft threads so that the nut may be rapidly advanced on or removed from the shaft without rotation when the nut threads are out of engagement with the shaft threads.

5 Claims, 2 Drawing Figures

SPEED NUT FOR A WHEEL BALANCER

FIELD OF THE INVENTION

This invention relates to wheel balancers and speed nuts therefor whereby the mounting and the demounting of a wheel on the shaft of a wheel balancer may be expedited.

BACKGROUND ART

In recent years, there has been a vast upsurge in the use of highly sophisticated wheel balancers for balancing wheels prior to their mounting on a vehicle. Such wheel balancers typically employ highly sensitive electronic circuitry and sensors for determining the location and degree of imbalance of a wheel mounted on a shaft forming part of the wheel balancer and which is driven.

In the typical wheel balancer, there is a locating device, frequently in the form of a spring biased cone, surrounding the shaft at the driven end thereof so as to precisely center the wheel about the rotational axis of the shaft. The shaft typically is threaded and a nut is threaded onto the shaft to engage the wheel and firmly hold the same against the locating device prior to testing. Thus, in order to mount or demount a wheel from the shaft, it is necessary to thread the nut onto the shaft or thread the nut off of the shaft, as the case may be.

Because of the large variety of vehicle wheels which are balanced on such wheel balancers, provision must be made in the wheel balancer to accomodate the vast majority of such differing wheel types. This has frequently required that the shaft, or an extension thereof, be relatively long. As a consequence, considerable time may be spent rotating the nut structure on the shaft to the point that it properly engages the wheel in a mounting operation or in rotating the nut to remove the same from the shaft to allow the wheel to be demounted from the balancer. This time spent is costly in terms of labor expense and, in volume operations, considerably decreases the efficiency of the operation by diminishing the number of wheels that may be balanced on a wheel balancer in a given period of time.

SUMMARY OF THE INVENTION

It is the principal object of the invention to provide a new and improved wheel balancer. More specifically, it is the object of the invention to provide a new and improved wheel balancer wherein the time spent in mounting or demounting a wheel therefrom is considerably minimized to thereby effect labor and time savings in each wheel balancing operation.

An exemplary embodiment of the invention achieves the foregoing object in a wheel balancer including a threaded shaft having a free end for receiving a wheel to be balanced. The balancer includes means for rotating the shaft with a wheel secured thereon so as to enable the obtaining of data relative to unbalance of the wheel as the wheel rotates. A locating device is utilized for engaging a wheel on the shaft for locating the wheel properly thereon such that it is centered upon the rotational axis of the shaft. Nut means are provided on the shaft for holding a wheel thereon and against the locating device. The nut means includes nut threads for engagement with the threads of the shaft and means for selectively moving the nut threads radially inwardly into engagement with the shaft threads or radially outwardly out of engagement with the shaft threads so that the nut means may be rapidly advanced on or removed from the shaft without rotation when the nut threads are out of engagement with the shaft threads.

According to another facet of the invention, there is provided a speed nut for use on a threaded shaft which includes at least two threaded elements each having an arc length of 180° or less. Means mount the elements for movement toward and away from each other between first positions for engaging the threads on a shaft and second positions for disengagement from threads on a shaft. Means are provided for normally urging the elements toward the second position and there are utilized means responsive to an axial force in the nut for moving the elements to the first positions. Means are provided which cooperate with a threaded shaft and are responsive to engagement of the elements with a threaded shaft and a compressive axial force on the nut for holding the elements in the first position.

As a consequence, the nut may be slid onto a threaded shaft and the requisite forces applied to the nut structure to first cause engagement of the threaded elements with the threaded shaft and then hold such elements in such engagement until the compressive forces release. At that time, threaded elements will automatically return to the second positions out of engagement with the threads on the shaft allowing the nut to be slidably removed therefrom. Thus, the nut structure need only be rotated for final tightening or initial loosening avoiding excessive time spent in placing the structure on or removing it from a shaft.

Other objects and advantages will become apparent from the following specification taken in connection with the drawings.

DESCRIPTION OF THE PREFERRED EMBODIMENT

Figure 1:
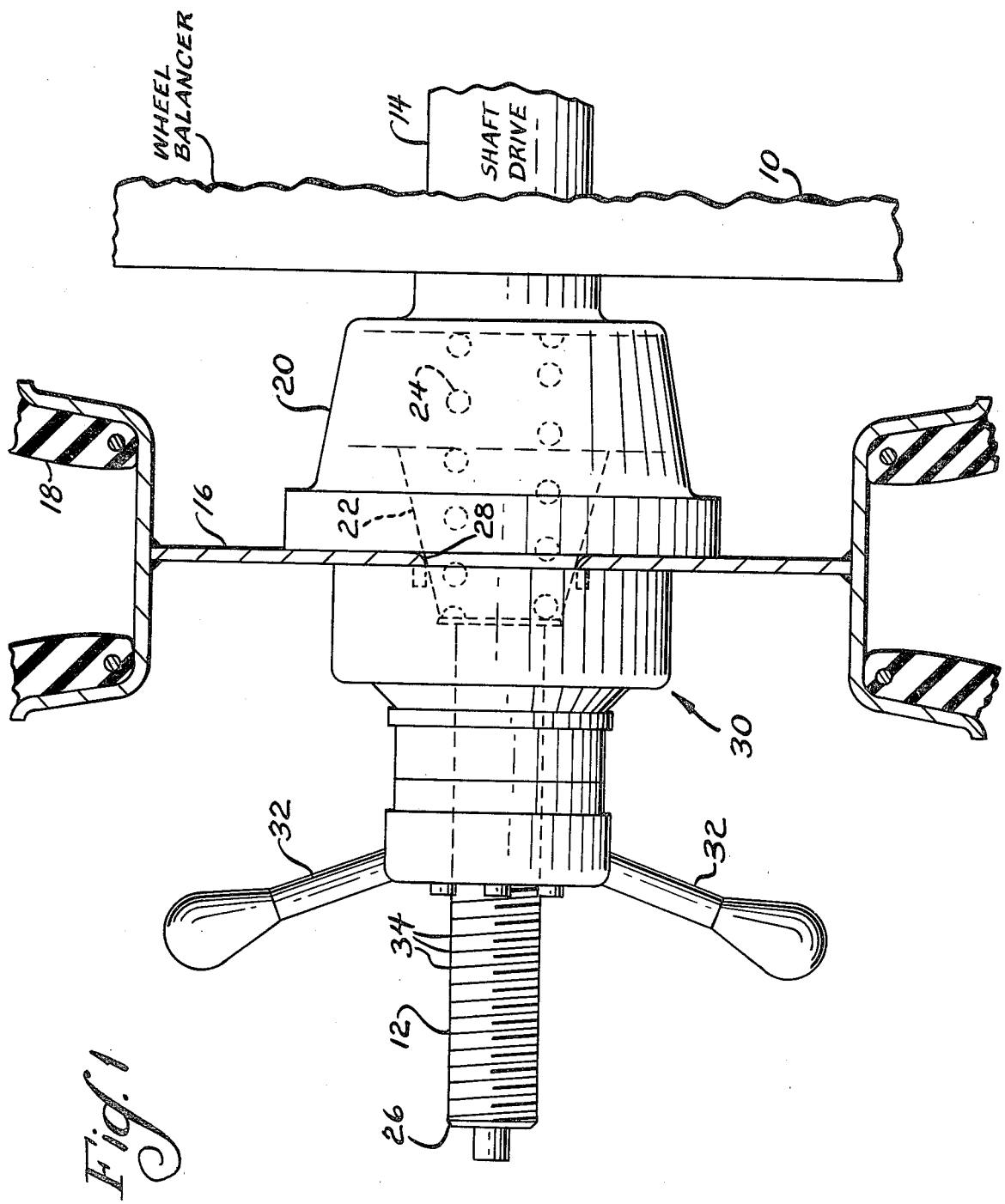
FIG. 1 is an elevational view of a wheel balancer embodying the speed nut and made according to the invention.

An exemplary embodiment of a wheel balancer made according to the invention is illustrated in FIG. 1 and includes a wheel balancer frame shown somewhat schematically at 10 which journals a rotatable, threaded shaft 12. Means 14 forming part of the wheel balancer are suitably coupled to the shaft 12 for rotating the same and as is conventional, suitable sensors and detecting circuitry which may be of a conventional nature (not shown) are utilized for acquiring data to determine the degree of imbalance of a wheel 16 having a tire 18 thereon which is rotated with the shaft 12. Typically, such circuitry will provide not only an indication of where one or more balancing weights should be placed on the wheel 16, but an indication of the amount of such weight as well.

Typically, the balancer will include a cup-like locating structure 20 concentric with the shaft 12 which mounts a conical locating element 22 for movement along the axis of the shaft 12. A spring 24 contained within the cup 20 is employed to bias the cone 22 towards the free end 26 of the shaft so that the same may enter the center opening 28 of the wheel 16 to center the wheel about the rotational axis of the shaft 12. A nut structure, generally designated 30, is disposed on the shaft 12 and is in engagement with the wheel 16 on the side thereof opposite from the cone 22. The nut structure 30 is operative to hold the wheel firmly against the locating cup 20 and the cone 22 as well as to retain the wheel 16 on the shaft 12 to be rotated thereby. As can be seen, the nut structure 30 is provided with handles 32 whereby the same may be rotated on the shaft 12 when threaded elements to be described forming part of the nut structure 30 are in engagement with the threads 34 on the shaft 12.

Figure 2:
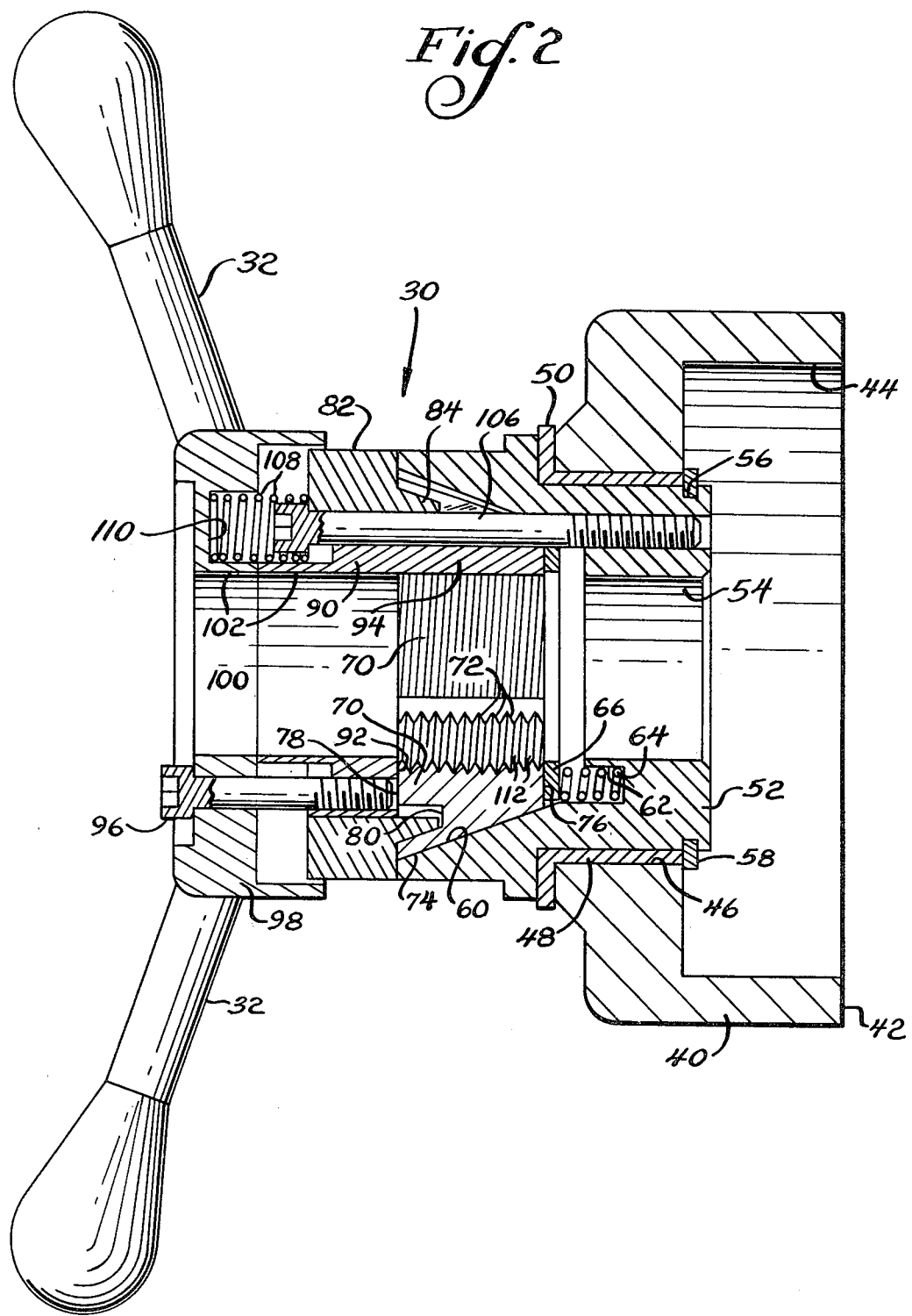
FIG. 2 is an enlarged, sectional view of the speed nut.

Turning now to FIG. 2, the nut structure 30 will be described in greater detail. The same includes a cup 40 having a flat end surface 42 for engagement with the wheel and an interior, annular recess 44 for receipt of so much of the locating element that may extend through the wheel 16 to the opposite side thereof. The base of the cup 40 includes a circular opening 46 which receives a collar 48 formed of Teflon ® or the like, the collar 48 having a radially outwardly extending, peripheral flange 50 and serving as a spacer for purposes to be seen.

Received within the collar 48 is a front guide 52 having a central circular opening 54 having a slightly larger diameter than the diameter of the apex of the threads 34 on the shaft 12 (FIG. 1) so as to be slidable thereon. On its outer surface, the front guide 52 includes an annular, radially outwardly opening recess 56 for receipt of a lock ring 58 which abuts both one end of the collar 48 and the base of the cup 40 for locating purposes.

The front guide 52 also includes an interior conical surface 60 whose smallest diameter is considerably greater than the diameter of the opening 54 and which acts as a ramp-like surface for purposes to be seen. Adjacent the narrowest portion of the conical surface 60, the front guide 52 includes axially directed bores 62 for receipt of springs 64 which act against a thrust washer 66.

Two or more threaded elements 70 are slidably received on the conical surface 60. Each of the elements 70 contains multiple threads 72 configured for engagement with the threads 34 on the shaft 12 (FIG. 1) so that the nut structure 30 may advance in either direction on the shaft 12 when rotated by the handles 32, dependent upon the direction of such rotation. Each of the threaded elements 70 has an arc length of 180° or less where two such elements are used and each will have an arc length of 120° or less where three such elements are employed, etc.

In any event, the sides 74 of each of the threaded elements 70 will have a configuration corresponding to that of part of a cone similar to the cone surface 60.

The narrow ends 76 of each of the threaded elements bear against the thrust washer 66 while the wide ends 78 of each of the elements are provided with retention grooves 80.

An annular rear guide 82 is abutted against the left-hand end of the front guide 52 as seen in FIG. 2 and includes an annular, axially directed tongue 84 which is received in the retention grooves 80 of the elements 70.

As will be seen, the elements 70 move from a radially outermost position as illustrated in FIG. 2 wherein they will not engage the threads 34 on the shaft 12 to a radially innermost position wherein the threads 34 on the shaft 12 will be engaged by the threads 72 to couple the nut 30 to the shaft 12 by moving axially to the right as viewed in FIG. 2 thereby sliding upwardly and inwardly on the ramp-like surface defined by the cone 60. The arrangement is such, however, that the axial movement that is involved is limited by abutment of the thrust washer 60 with the front guide 52 with the axial length of the tongue 84 being greater than the maximum axial travel of the elements 70 providing for positive retention of the threaded elements 70 against the surface 60 at all times.

Disposed within the interior opening of the rear guide 82 is a slider 90 having surfaces 92 which engage portions of the wide ends 78 of the elements 70. The slider 90 may also include axial fingers 94 that extend between the threaded elements 70.

Cap screws 96 couple the slider 90 to a crankplate 98 bearing the handles 32. Both the slider 90 and the crankplate 98 have interior circular bores 100 and 102 of the same diameter as the opening 54 in the front guide 52.

Internal cap screws 106 couple the rear guide 82 to the front guide 52 and the heads of the cap screws 106 serve as locating devices for compression springs 108 which are received in bores 110 in the crankplate 98 to bias both the crankplate 98 and the slider 90 away from the cup 40.

Returning to the threads 34 and 72 and the surface 60, it should be observed that it is necessary that the angle of the surface 60 with respect to the rotational axis of the nut 30, which is, of course, the axis of the shaft 12 as well, be less than the angle of faces 112 of the threads 72 (and their counterparts on the threads 34) with respect to a plane at right angles to the axix. This interrelationship serves to hold the elements 70 in engagement with the threaded shaft 12 under desired circumstances that will be seen.

In operation, a wheel 16 to be balanced is placed on the shaft 12 via the free end 26 thereof and located on the cone 22 as illustrated. The nut 32 is then applied to the shaft 12 in the following manner. Initially, because of the bias of the springs 64 urging the threaded elements 70 to the left as viewed in FIG. 2, such elements will be in the radially outermost position and accordingly will be retracted with respect to the openings 54, 100 and 102 of the nut structure 30. Accordingly, the nut structure can be axially slid onto the shaft 12 without rotation until the end 42 of the cup 40 abuts the wheel 16. Further axial movement of the nut structure 30 will incur resistance due to the presence of the spring 24 in the balancer itself. As a consequence, continued application of such axial force will result in the crankplate 98 and the slider 90 moving to the right with respect to other nut structure components as viewed in FIG. 2. This will in turn cause the slider 90, by reason of its engagement with the ends 78 of the elements 70, to move the elements 70 axially to the right as viewed in FIG. 2 causing the same to be cammed radially inwardly and into engagement with the threads 34 on the shaft 12. Continued application of pressure by reason of manual force being exerted to telescope the crankplate 98 onto the remainder of the nut structure, will result in the threads 72 fully entering the threads 34 such that the faces 112 will be in face-to-face engagement with their counterparts on the shaft 12. The release of the axial compressive force at this point in time will not allow the springs 64 to move the elements 70 to their retracted position since, by reason of the angular relationship of the surface 60 and the faces 112 of the threads 72 to the shaft axis, an interference fit will be present. That is, because of the angular relationship, the faces 112 will not be free to slide on the mating spaces of the threads 34 and engagement will be maintained. At this time, the handles 32 may be utilized to impart a few turns of rotation to the nut structure 30 to securely locate the wheel 16 concentrically on the shaft 12 for rotation therewith. The balancing operation may then proceed.

When it is desired to remove the wheel 16 from the balancer, the nut structure 30 is rotated in the opposite direction by use of the handle a few turns until the spring 24 is no longer compressed. At this time, the engagement between the threaded elements 70 and the threaded shaft 12 will be loose allowing the elements 70 to retract under influence of the springs 64. The nut structure 30 may then be removed from the shaft 12 by axial sliding thereon and without rotation.

From the foregoing, it will be appreciated that a wheel balancer made according to the invention allows considerable time saving in the process of mounting and demounting wheels to be balanced on the balancer thereby effecting a considerable labor saving and allowing a fuller utilization of the balancer itself.

I claim:

1. A wheel balancer including: a threaded shaft having a free end for receiving a wheel to be balanced; means for rotating the shaft with a wheel secured thereon so as to enable the obtaining of data relative to unbalance of the wheel as the wheel rotates; a locating device for engaging a wheel on the shaft and for locating the wheel on the shaft; and nut means receivable on said shaft for holding a wheel thereon and against said locating device, said nut means including nut threads for engagement with the threads on said shaft, means for selectively moving said nut threads radially inwardly into engagement with said shaft threads and outwardly out of engagement with said shaft threads, whereby said nut means may be rapidly advanced on or removed from said shaft without rotation when said nut threads are out of engagement with said shaft threads, said selective moving means comprising means normally moving said nut threads radially outwardly and cam means operable to move said nut threads radially inwardly; said locating device being biased twoard said free end and said cam means including a ramp-like surface slidably receiving said nut threads and at an angle to the axis of said shaft less than the angle of the faces of said threads to a plane at right angles to said axis; and manual means for sliding said nut thread on said surface to cause the same to be cammed radially inwardly.

2. A wheel balancer including: a threaded shaft having a free end for receiving a wheel to be balanced; means for rotating the shaft with a wheel secured thereon so as to enable the obtaining of data relative to unbalance of the wheel as the wheel rotates; a locating device for engaging a wheel on the shaft and for locating the wheel on the shaft; and nut means receivable on said shaft for holding a wheel thereon and against said locating device, said nut means including nut threads radially movable between a first position engaged with the threads on said shaft and a second position disengaged from said shaft threads, means normally urging said nut threads to said second position, and means responsive solely to resistance to axial movement on said shaft for moving said nut threads to said first position.

3. The wheel balancer of claim 2 further including means responsive to engagement of said nut threads with said shaft threads and an axial compressive force on said nut means for holding said nut threads in said first position.

4. A speed nut for use on a threaded shaft comprising:
- at least two threaded elements each having an arc length of 180° or less,
- means mounting said elements for movement toward and away from each other between first positions for engaging the threads on a shaft and second positions for disengagement from threads on a shaft;
- means normally urging said elements toward said second positions;
- means separate from said urging means and responsive to an axial force on said nut for moving said elements against said urging means to said first position; and
- means cooperating with a threaded shaft and responsive to both (a) engagement of said elements with a threaded shaft and (b) a compressive axial force on said nut for holding said elements in said first position.

5. The speed nut of claim 4 wherein said mounting means comprises a telescoping housing having a ramp-like interior surface slidably receiving said elements configured such that said elements are moved to said first position when said housing is telescoped, said surface being at an angle to the axis of said nut less than the angle of the faces of the threads on said element to a plane at right angles to said axis.

* * * * *